United States Patent
Park et al.

(10) Patent No.: US 9,849,853 B2
(45) Date of Patent: Dec. 26, 2017

(54) AIR BAG SENSOR ASSEMBLY

(71) Applicant: SUNGWOO HITECH CO., LTD., Busan (KR)

(72) Inventors: Woo Bum Park, Suwon (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 0 days.

(21) Appl. No.: 15/156,443

(22) Filed: May 17, 2016

(65) Prior Publication Data

US 2017/0174164 A1 Jun. 22, 2017

(30) Foreign Application Priority Data

Dec. 18, 2015 (KR) .................. 10-2015-0181667

(51) Int. Cl.
*B60R 21/0136* (2006.01)
*B60R 19/48* (2006.01)
*B60R 21/01* (2006.01)

(52) U.S. Cl.
CPC ........ *B60R 21/0136* (2013.01); *B60R 19/483* (2013.01); *B60R 2021/01286* (2013.01)

(58) Field of Classification Search
CPC .... B60R 21/0136; B60R 19/48; B60R 19/483
See application file for complete search history.

(56) References Cited

U.S. PATENT DOCUMENTS

| | | | | |
|---|---|---|---|---|
| 3,789,949 | A * | 2/1974 | Bortfeld | B60R 21/0136 200/82 D |
| 5,307,896 | A * | 5/1994 | Taguchi | B60R 21/0136 180/274 |
| 7,293,809 | B2 * | 11/2007 | Suzuki | B60R 21/0136 293/117 |
| 2005/0121925 | A1 * | 6/2005 | Federspiel | B60R 21/0136 293/109 |
| 2007/0040663 | A1 * | 2/2007 | Steele | B60R 19/48 340/467 |
| 2007/0114803 | A1 * | 5/2007 | Takahashi | B60R 19/483 293/102 |
| 2008/0203742 | A1 * | 8/2008 | Takahashi | B60R 19/483 293/117 |
| 2014/0050438 | A1 * | 2/2014 | Hwang | G01D 5/35303 385/13 |
| 2015/0336527 | A1 * | 11/2015 | Ghannam | G01L 19/0069 73/723 |

FOREIGN PATENT DOCUMENTS

| | | |
|---|---|---|
| JP | 06-087403 | 3/1994 |
| JP | 2007-302060 | 11/2007 |
| KR | 20-1998-0016981 | 7/1998 |
| KR | 10-1529429 | 6/2015 |

* cited by examiner

*Primary Examiner* — James A English
(74) *Attorney, Agent, or Firm* — Lex IP Meister, PLLC

(57) ABSTRACT

An air bag sensor assembly for a vehicle is disclosed. An air bag sensor assembly that detects a crash impact of a vehicle so as to control an air bag module in accordance with a detected signal according to an exemplary embodiment of the present invention may include a holder that is screw-engaged with a sensor mounting portion of a vehicle body structure having a closed section, and a sensor module that includes a touch sensor that is disposed in the closed section of the vehicle body to be spaced from a transformation part thereof, and is fixed to the holder.

4 Claims, 4 Drawing Sheets

AIR BAG SENSOR ASSEMBLY

CROSS-REFERENCE TO RELATED APPLICATION

This application claims priority to and the benefit of Korean Patent Application No. 10-2015-0181667 filed in the Korean Intellectual Property Office on Dec. 18, 2015, the entire contents of which are incorporated herein by reference.

BACKGROUND OF THE INVENTION (a) Field of the Invention

An exemplary embodiment of the present invention relates to an air bag system for a vehicle. More particularly, the present invention relates to an air bag sensor assembly for a vehicle that detects a crash of a vehicle so as to determine unfolding of an air bag.

(b) Description of the Related Art

Generally, various safety systems that prepare for unpredictable situations are disposed in a vehicle to protect a driver and a passenger. A notable system is an air bag system that direct protects a driver and a passenger when a vehicle is crashed.

An air bag system includes a collision detection device, an air bag module, and an electronic control device. The collision detection device includes an air bag sensor that detects a collision of a vehicle. The air bag module includes an air bag and a gas expansion device ("air bag explosion device" in this technical field). The electronic control device receives a detection signal of the air bag sensor and controls the gas expansion device depending on the detection signal.

The air bag system outputs the detection signal to the electronic control device if a collision is detected by the air bag sensor. Then, the electronic control device receives the detection signal of the air bag sensor and determines whether the air bag is to be expanded or not depending on the signal.

Accordingly, the air bag system operates the gas expansion device through the electronic control device according to the detection signal of the air bag sensor and injects compressed gas into the air bag through the gas expansion device, and the air bag that is unfolded by the compressed gas protects a driver or a passenger.

Here, the air bag sensor applies an acceleration sensor detecting sensor and is disposed at main collision prediction parts. For example, the air bag sensor is fixed to a vehicle body through a sensor fixation bracket. In this case, the air bag sensor is fixed to the sensor fixation bracket through a bolt, and the sensor fixation bracket is engaged with the vehicle through a bolt.

However, an acceleration sensor as an air bag sensor is disposed to detect acceleration variation according to collision of a vehicle in a conventional art so as to detect acceleration only within a specific collision angle, and thus it is difficult to control an operation of an air bag module corresponding to various collision directions and angles.

Further, because an air bag sensor is fixed to a sensor fixation bracket, which is fixed to a vehicle body through a bolt, the air bag sensor can be abnormally operated in a conventional art if the bolt becomes loose by continuous variation and force while a vehicle is operated. In addition, a sensor fixation bracket that is fixed to a vehicle body can be damaged by vehicle collision in a conventional art, and an air bag sensor can malfunction.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an air bag sensor assembly for a vehicle having advantages of accurately detecting an impact amount so as to determine unfolding of an air bag regardless of a crash direction and a crash angle.

Further, exemplary embodiments of the present invention provide an air bag sensor assembly for a vehicle preventing a condition in which an engagement force is deteriorated by a continuous vibration or an outside force that is generated by an operation of a vehicle or preventing a condition in which malfunction is generated by an impact of a vehicle crash.

An air bag sensor assembly that detects a crash impact of a vehicle so as to control an air bag module in accordance with a detected signal according to an exemplary embodiment of the present invention may include a holder that is screw-engaged with a sensor mounting portion of a vehicle body structure having a closed section, and a sensor module that includes a touch sensor that is disposed in the closed section of the vehicle body to be spaced from a transformation part thereof and is fixed to the holder.

The holder may be disposed to have a bolt shape that is engaged with a sensor mounting portion of the vehicle body structure.

The holder may include a head portion that supports a sensor mounting portion of the vehicle body structure, and a shank portion that is integrally connected to the head portion and is engaged with an engagement hole that is formed in a sensor mounting portion of the vehicle body structure to fix the sensor module.

The shank portion may have a screw thread that is engaged with the engagement hole at an external circumference and a fixation groove to fix the sensor module.

The head portion may have a wiring hole that is connected to the fixation groove.

The sensor module may include a sensor support rod to which the touch sensor is fixed at one end portion thereof and the other end portion thereof is fixed to the shank portion.

The sensor module may include a sensor support rod to which the touch sensor is fixed at one end portion thereof and the other end portion thereof is fixed on the shank portion, and the other end portion of the sensor support rod is forcibly inserted into the fixation groove of the shank portion.

The sensor support rod may have a guide hole that guides wiring, which is connected to the touch sensor, to the wiring hole.

The guide hole may be connected to the wiring hole.

The head portion may be attached on a sensor mounting portion of the vehicle body structure through an adhesive.

Further, an air bag sensor assembly for a vehicle that is mounted on a bumper beam disposed in a width direction of a vehicle body detects a collision of a vehicle and controls an air bag module depending on the detected signal according to an exemplary embodiment of the present invention may include a plurality of holders that are engaged on one surface of a closed section portion of a bumper beam corresponding to a vehicle body and arranged along the closed section at a predetermined interval, and a sensor module that includes touch sensors that are disposed to be spaced apart from the other surface of the closed section portion of the bumper beam.

The holder may have a bolt shape that can be engaged with an engagement hole that is formed at one side of the closed section portion.

The holder may include a head portion that supports one surface of the closed section portion, and a shank portion that is integrally connected to the head portion and is screw-engaged with the engagement hole.

The shank portion may be a hollow type having a fixation groove that is formed in a length direction from a head portion to the other side.

A wiring hole may be formed in the head portion to be connected to the fixation groove.

The sensor module may include a sensor support rod to which the touch sensor is fixed at one side end portion thereof, and the other side end portion thereof is forcibly inserted to be fixed to the fixation groove.

The head portion is attached on a sensor mounting portion of the vehicle body structure through an adhesive.

In exemplary embodiments of the present invention, because a touch sensor is disposed inside a closed section of a vehicle body structure, a touch sensor can accurately detect an impact amount or an impact force from transformation of a vehicle body structure regardless of a crash direction and a crash angle, when an impact is applied to a vehicle body structure.

Also, in an exemplary embodiment of the present invention, because a sensor module is direct fixed to a holder of a bolt type that is screw-engaged to a vehicle body structure and the holder is further fixed by an adhesive on the vehicle body structure, an engagement force of the sensor module to a vehicle body structure can be further improved.

Accordingly, in an exemplary embodiment of the present invention, because an engagement force of a holder is not deteriorated by a continuous vibration or an outside force that is generated by an operation of a vehicle or a sensor module is not damaged by an impact, the malfunction of the touch sensor is prevented in advance in an exemplary embodiment of the present invention.

In addition, in an exemplary embodiment of the present invention, a simple structure and assembly method in which a sensor module is fixed to a holder and the holder is screw-engaged to a vehicle body structure can notably decrease production cost.

BRIEF DESCRIPTION OF THE DRAWINGS

The drawings are provided to be referred to in explaining exemplary embodiments of the present invention, and the spirit of the present invention should not be construed to be limited by the accompanying drawing.

DETAILED DESCRIPTION OF THE EMBODIMENTS

Figure 1:
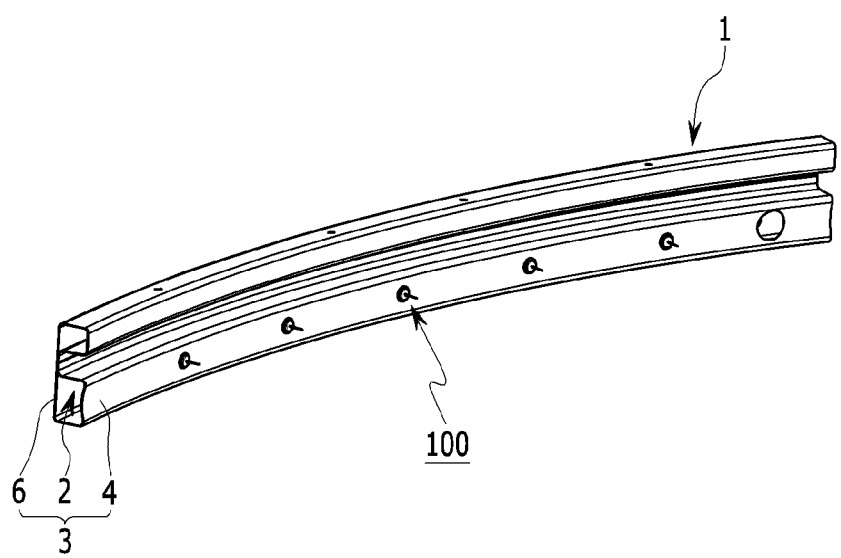
FIG. 1 is an assembled perspective view showing an air bag sensor assembly for a vehicle according to an exemplary embodiment of the present invention.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

The size and thickness of each component shown in the drawings are arbitrarily shown for better understanding and ease of description, but the present invention is not limited thereto, and the thickness of parts, regions, etc., are exaggerated for clarity.

Further, elements are termed a first . . . , a second . . . , and the like, in the detailed description below because the configurations of the elements are the same, and the names are not essentially limited to the order in the description below.

Throughout this specification and the claims which follow, unless explicitly described to the contrary, the word "comprise" or variations such as "comprises" or "comprising" will be understood to imply the inclusion of stated elements but not the exclusion of any other elements.

In addition, the terminologies such as " . . . unit", " . . . means", " . . . part", or " . . . member", which are disclosed in the specification, refer to a unit of an inclusive constituent which performs at least one of functions or operations.

Figure 2:
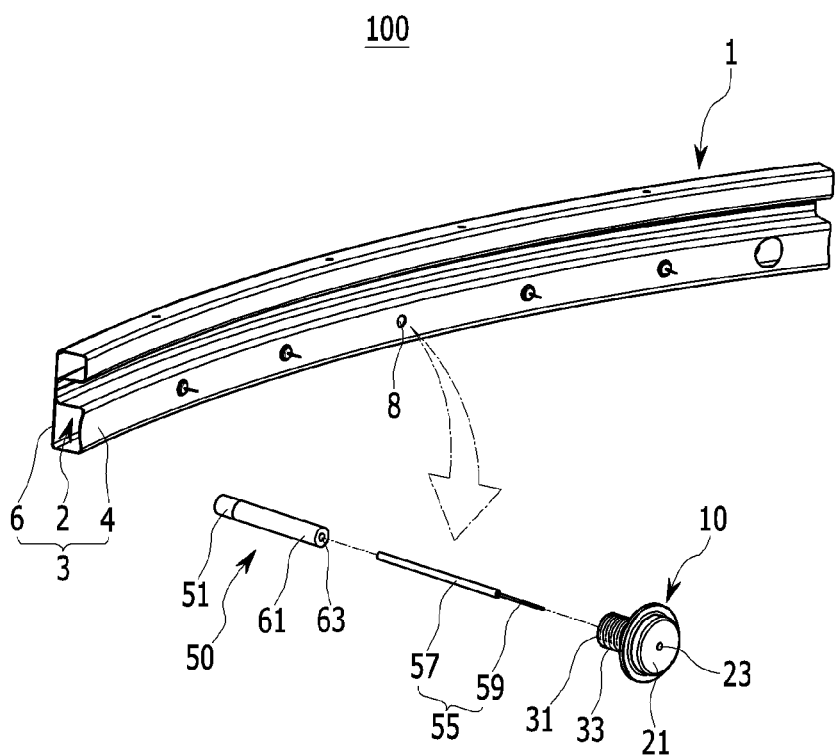
FIG. 2 is an exploded perspective view showing an air bag sensor assembly for a vehicle according to an exemplary embodiment of the present invention.
Figure 3:
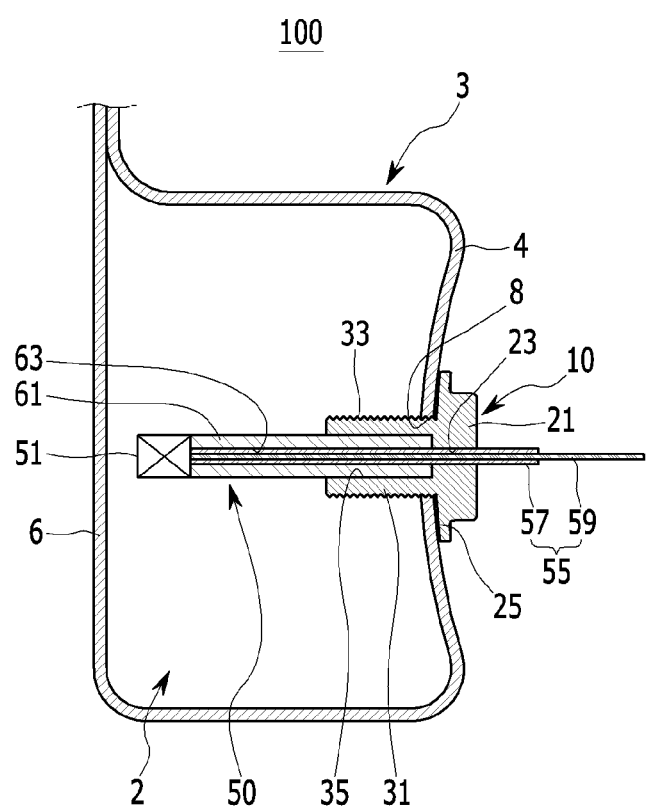
FIG. 3 is an assembled section schematic diagram showing an air bag sensor assembly for a vehicle according to an exemplary embodiment of the present invention.

FIG. 1 is an assembled perspective view showing an air bag sensor assembly for a vehicle according to an exemplary embodiment of the present invention, FIG. 2 is an exploded perspective view of FIG. 1, and FIG. 3 is a section schematic diagram of FIG. 1.

Referring to FIG. 1 to FIG. 3, an air bag sensor assembly 100 for a vehicle according to an exemplary embodiment of the present invention can be applied to an air bag system that is configured to protect a driver and a passenger when a vehicle has a collision.

An air bag system includes the air bag sensor assembly 100 and an air bag module (not shown in drawings) according to an exemplary embodiment of the present invention. Here, the air bag module includes an air bag and an air bag expansion device.

The air bag can be an external type that is disposed at a collision portion of a vehicle outer side, and can be an interior type that is disposed at a front, a side, and a rear inside a vehicle. An air bag expansion device is exploded by an electronic control unit (ECU) depending on the detection signal to be able to inject compressed gas into an air bag.

The air bag and air bag explosion device forming the air bag module are well known to a person skilled in this art, and thus detailed description thereof will be omitted in this specification.

An air bag sensor assembly 100 according to an exemplary embodiment of the present invention is mounted at a main part of a vehicle where a collision is predicted, detects impact force of the collision, and is mounted on a vehicle body structure 1.

For example, a vehicle body structure 1 can include a bumper beam 3 that is disposed in a width direction of a vehicle at a front side and a rear side of a vehicle body in an exemplary embodiment of the present invention. The bumper beam 3 can be assembled to a front and a rear side member of a vehicle body through a stay (not shown) and a mounting bracket (not shown) of both end portions.

Here, the bumper beam 3 includes at least one closed section portion 2 that forms a closed section along a vehicle width direction. The closed section portion 2 forms one side that corresponds to a vehicle body and the other side at which an impact is substantially applied.

One side of the closed section portion 2 is a sensor mounting portion of a vehicle body structure 1, and hereinafter the one side of the closed section portion 2 is called a first surface 4 for convenience of description. Further, the other side of the closed section portion 2 is a part of a vehicle body structure which is to be transformed, and hereinafter the other side of the closed section portion 2 is called a second surface 6 for convenience of description.

However, an air bag sensor assembly 100 according to the present invention is not limited to a vehicle body structure 1 as a bumper beam 3, and can be variously applied to a vehicle body structure having a closed section that can be collided.

The air bag sensor assembly for a vehicle 100 according to an exemplary embodiment of the present invention has a structure that can accurately detect an impact level so as to determine whether an air bag has to be unfolded regardless of a collision direction and a collision angle.

Also, an exemplary embodiment of the present invention offers an air bag sensor assembly 100 for a vehicle that prevents a condition in which an engagement force is deteriorated by continuous vibration or an outside force that is generated by an operation of a vehicle or prevents a condition that malfunction is generated by an impact of a vehicle crash.

For this, the air bag sensor assembly 100 for a vehicle according to an exemplary embodiment of the present invention basically includes a holder 10 and a sensor module 50.

In an exemplary embodiment of the present invention, the holder 10 is used to support the sensor module 50 that is to be described hereinafter. A plurality of the holders 10 are disposed at a predetermined interval along the first surface 4 of the vehicle body structure 1 as described above. The holder 10 is screw-engaged with the first surface 4 of the vehicle body structure 1.

The holder 10 is a bolt type that is screw-engaged with the first surface 4 of the vehicle body structure 1. That is, the holder 10 is disposed to be a bolt type that can be screw-engaged with an engagement hole 8 that is formed on the first surface 4 of the vehicle body structure 1.

Specifically, the holder 10 includes a head portion 21 and a shank portion 31. The head portion 21 supports the first surface 4 of the vehicle body structure 1. Further, the shank portion 31 fixes the sensor module 50 that is to be described hereinafter. The shank portion 31 is integrally connected to the head portion 21, and is screw-engaged with the engagement hole 8 of the first surface 4.

Here, the shank portion 31 has a ring type circular section of which a center portion is hollow from a connection side of the head portion to the other side, and has a screw thread 33 on an external circumference that is screw-engaged with the engagement hole 8 of the first surface 4.

In this case, the shank portion 31 is screw-engaged with the engagement hole 8 of the first surface 4 through the screw thread 33, and is disposed at an inner side of the closed section portion 2. And, a hollow portion of the shank portion 31 has a fixation groove 35 that is used to fix the sensor module 50 that will be described hereinafter.

Meanwhile, a wiring hole 23 is formed in the head portion 21 to draw out wiring 55 of the sensor module 50 to the outside of the closed section portion 2. The wiring hole 23 is connected to the fixation groove 35 of the shank portion 31.

In addition, the head portion 21 of the holder 10 is attached on the first surface 4 through an adhesive 25 so as to increase coupling force of the holder 10 to the first surface 4 of the vehicle body structure 1 in an exemplary embodiment of the present invention.

The adhesive 25 is an adhesive material of a well-known structure that is used to bond a steel panel, and is coated on the first surface 4 corresponding to a head surface of the head portion 21 to bond the head surface of the head portion 21 to the first surface 4.

In an exemplary embodiment of the present invention, the sensor module 50 contacts the second surface 6 of the vehicle body structure 1 that is to be transformed when a vehicle is collided, detects an impact amount that is applied to the second surface 6, and transmits the detected signal to the electronic control device that is described above.

The sensor module 50 is fixed on the shank portion 31 of the holder 10 in the closed section portion 2 of the vehicle body structure 1. The sensor module 50 includes a touch sensor 51 and a sensor support rod 61.

The touch sensor 51 substantially detects an impact amount that is applied through the second surface 6, transmits the detected signal to the electronic control device, is disposed inside the closed section portion 2, and is connected to the shank portion 31 of the holder 10 through the sensor support rod 61 that is to be described below.

The touch sensor 51 is disposed to be spaced apart from the second surface 6 inside the closed section portion 2. The touch sensor 51 contacts the second surface 6 that is a transformation portion of the vehicle body structure 1 during a collision of a vehicle, transforms an impact amount or impact force that is offered by the second surface 6 to an electrical signal, and transmits the electrical signal to the electronic control device. The touch sensor 51 is a contact sensor that is well-known in the field of this art, and a detailed description will be omitted in this specification.

Here, a distance between the touch sensor 51 and the second surface 6 is a factor that determines an impact amount or an impact force that expands the air bag. The distance is not limited to one specific value in an exemplary embodiment of the present invention, because a transformation amount of the second surface 6 can be changed by an impact amount or an impact force that unfolds the air bag in accordance with a design specification and a material of the vehicle body structure 1.

The sensor support rod 61 supports the touch sensor 51 and is further disposed to be a medium that connects the touch sensor 51 to the shank portion 31 of the holder 10. For example, the sensor support rod 61 is made of a metal material having strength that supports an impact amount or an impact force that is applied to the touch sensor 51.

The touch sensor 51 is fixed at one side end portion of the sensor support rod 61, and the other side end portion is fixed to the fixation groove 35 of the shank portion 31 that is described above. For example, one side end portion of the sensor support rod 61 can be engaged with the touch sensor 51 through the screw thread or adhesive and the other side end portion of the sensor support rod 61 can be engaged with the fixation groove 35 of the shank portion 31 through forcible insertion.

Meanwhile, the touch sensor 51 includes the wiring 55 that is electrically connected to the electronic control device.

The wiring 55 includes a detection signal line 59 on which an insulation material 57 is coated.

The wiring 55 is drawn out of the closed section portion 2 through the sensor support rod 61 and the holder 10, and for this, a guide hole 63 is formed in the sensor support rod 61 so as to guide the wiring 55 to the wiring hole 23 of the head portion 21. The guide hole 63 is a hollow space hole that is formed at an inner center along a length direction of the sensor support rod 61, and is formed from one side to the other side of the sensor support rod 61.

The guide hole 63 is connected to the wiring hole 23 of the head portion 21 that is connected to the fixation groove 35, because the other end portion of a sensor support rod 61 is connected to the fixation groove 35 of the shank portion 31.

That is, the wiring 55 is guided to the guide hole 63 of the sensor support rod 61 from the touch sensor 51 and is drawn out of the closed section portion 2 through the wiring hole 23 of the head portion 21.

Hereinafter, an assembly process and an operating effect of an air bag sensor assembly 100 for a vehicle according to an exemplary embodiment of the present invention as described above will be described referring to accompanying drawings.

Firstly, an assembly process of the air bag sensor assembly 100 for a vehicle according to an exemplary embodiment of the present invention is described as follow, wherein the engagement holes 8 are formed along a closed section of the bumper beam 3 at a predetermined distance on the first surface 4 of the bumper beam 3 of the vehicle body structure 1 in an exemplary embodiment of the present invention.

The touch sensor 51 is fixed to one side end portion of the sensor support rod 61 on the sensor module 50 in an exemplary embodiment of the present invention, and the wiring 55 of the touch sensor 51 is guided to the guide hole 63 of the sensor support rod 61 to be drawn out of the guide hole 63.

In this condition, the other side end portion of the sensor support rod 61 is forcibly inserted into the fixation groove 35 of the shank portion 31 in the holder 10 in an exemplary embodiment of the present invention. At this time, the wiring 55 that is drawn out of the guide hole 63 is drawn out through the wiring hole 23 of the head portion 21 in the fixation groove 35 of the shank portion 31.

Next, the sensor support rod 61, to which the touch sensor 51 is disposed, is inserted into the closed section portion 2 through the engagement hole 8 of the first surface 4, and then the shank portion 31 of the holder 10 is screw-engaged with the engagement hole 8 through the screw thread 33 in an exemplary embodiment of the present invention.

In this process, the adhesive 25 is coated on the first surface 4 corresponding to the head surface of the head portion 21, and the head surface of the head portion 21 is bonded to the first surface 4 through the adhesive 25 in an exemplary embodiment of the present invention.

Accordingly, the touch sensor 51 of the sensor module 50 can be disposed in the closed section portion 2 to be spaced apart from the second surface 6 of the vehicle body structure 1 by a predetermined distance in an exemplary embodiment of the present invention. Here, a distance between the second surface 6 and the touch sensor 51 can be determined by a length of the sensor support rod 61 that is engaged with the shank portion 31 of the holder 10 in the closed section portion 2.

Figure 4:
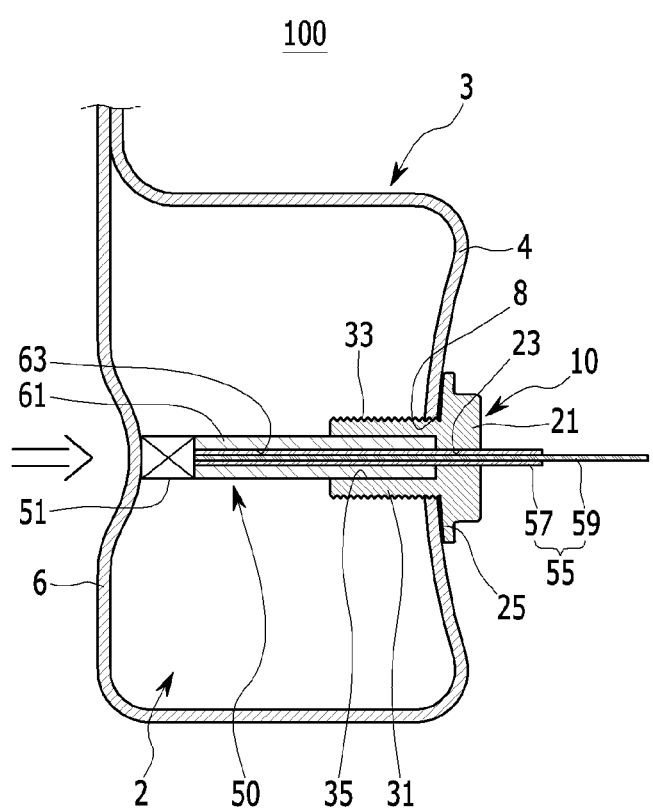
FIG. 4 is a section schematic diagram for describing an operation of an air bag sensor assembly for a vehicle according to an exemplary embodiment of the present invention.

In an air bag sensor assembly for a vehicle 100 that is assembled as described above according to an exemplary embodiment of the present invention, when a vehicle collides, as shown in FIG. 4, the second surface 6 that is a transformation portion of the vehicle body structure 1 is transformed by impact, and the touch sensor 51 of the sensor module 50 contacts the second surface 6 that is transformed.

Here, the transformed portion of the second surface 6 contacts the touch sensor 51 regardless of a collision direction and a collision angle when an impact is applied to the second surface 6 in an exemplary embodiment of the present invention.

Thus, the touch sensor 51 transforms an impact amount or impact force that is applied to the second surface 6 to electrical signals, and outputs the electrical signals to an electronic control unit (ECU) through the wiring 55.

Then, the electronic control unit (ECU) receives the electrical signals of the touch sensor 51, and determines whether the air bag is to be unfolded depending on the signal. For example, the electronic control unit (ECU) compares an impact amount or an impact force calculated by the electrical signal transmitted from the touch sensor 51 with a predetermined reference value, and if the impact amount or the impact force satisfies the reference value, an operation signal is transmitted to an air bag ignition device.

Accordingly, a compressed gas is quickly injected into the air bag through an air bag ignition device in an exemplary embodiment of the present invention, and a driver or a passenger can be protected by the air bag that is expanded by the compressed gas.

As described above, in an air bag sensor assembly 100 for a vehicle according to an exemplary embodiment of the present invention, the touch sensor 51 is disposed inside a closed section of the vehicle body structure 1, and when an impact is applied to the vehicle body structure 1, an impact amount or an impact force can be accurately detected through the touch sensor 51 regardless of a collision direction and a collision angle.

Also, the sensor module 50 is direct fixed to the bolt-type holder 10 that is screw-engaged with the vehicle body structure 1, and the holder 10 is combined with the vehicle body structure 1 through the adhesive 25 so as to increase a coupling force between the vehicle body structure 1 and the sensor module 50 in an exemplary embodiment of the present invention.

Accordingly, because an engagement force of the holder 10 is not deteriorated by a continuous vibration or an outside force that is generated by an operation of a vehicle or the sensor module 50 is not damaged by an impact, the malfunction of the touch sensor 51 is prevented in advance in an exemplary embodiment of the present invention.

In addition, a simple structure and assembly method in which the sensor module 50 is fixed to the holder 10 and the holder 10 is screw-fixed to the vehicle body structure 1 can notably decrease production cost in an exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

| 1 . . . vehicle body structure | 2 . . . closed section portion |
|---|---|
| 3 . . . bumper beam | 4 . . . first surface |
| 6 . . . second surface | 8 . . . engagement hole |

-continued

| | |
|---|---|
| 10 . . . holder | 21 . . . head portion |
| 23 . . . wiring hole | 25 . . . adhesive |
| 31 . . . shank portion | 33 . . . screw thread |
| 35 . . . fixation groove | 50 . . . sensor module |
| 51 . . . touch sensor | 55 . . . wiring |
| 57 . . . insulation material | 59 . . . signal line |
| 61 . . . sensor support rod | 63 . . . guide hole |

What is claimed is:

1. An air bag sensor assembly that detects a crash impact of a vehicle so as to control an air bag module in accordance with a detected signal, comprising:
   a holder that is screw-engaged with a sensor mounting portion of a vehicle body structure having a closed section; and
   a sensor module that includes a touch sensor that is disposed in the closed section of the vehicle body to be spaced from a transformation part thereof, and is fixed to the holder, the holder includes:
   a head portion that supports the sensor mounting portion of the vehicle body structure; and
   a shank portion that is integrally connected to the head portion and is engaged with an engagement hole that is formed in a sensor mounting portion of the vehicle body structure to fix the sensor module,
   the shank portion has a screw thread that is engaged with the engagement hole at an external circumference and a fixation groove to fix the sensor module,
   the head portion has a wiring hole that is connected to the fixation groove,
   the sensor module includes a sensor support rod to which the touch sensor is fixed at one end portion thereof,
   the other end portion of the sensor support rod is inserted into the fixation groove of the shank portion, and
   the sensor support rod has a guide hole that guides wiring, which is connected to the touch sensor and passes the guide hole and, to the wiring hole, and the guide hole is connected to the wiring hole.

2. The air bag sensor assembly of claim 1, wherein the holder is disposed to have a bolt shape that is engaged with the sensor mounting portion of the vehicle body structure.

3. The air bag sensor assembly of claim 1, wherein the sensor module includes a sensor support rod to which the touch sensor is fixed at one end portion thereof, and the other end portion thereof is fixed to the shank portion.

4. The air bag sensor assembly of claim 1, wherein the head portion is attached on a sensor mounting portion of the vehicle body structure through an adhesive.

* * * * *